(12) United States Patent
Hinkle (10) Patent No.: US 10,550,977 B1
(45) Date of Patent: Feb. 4, 2020

(54) OVERCENTER PIPE CLAMP AND METHOD FOR LAY FLAT TUBING

(71) Applicant: Billy Don Hinkle, Moro, AR (US)

(72) Inventor: Billy Don Hinkle, Moro, AR (US)

( * ) Notice: Subject to any disclaimer, the term of this patent is extended or adjusted under 35 U.S.C. 154(b) by 384 days.

(21) Appl. No.: 15/363,894

(22) Filed: Nov. 29, 2016

Related U.S. Application Data (63) Continuation-in-part of application No. 14/246,840, filed on Apr. 7, 2014, now abandoned.

(51) Int. Cl.
*F16L 31/00* (2006.01)
*F16L 11/12* (2006.01)
*F16L 21/06* (2006.01)

(52) U.S. Cl.
CPC ............... *F16L 31/00* (2013.01); *F16L 11/12* (2013.01); *F16L 21/06* (2013.01)

(58) Field of Classification Search
CPC .. F16L 11/12; F16L 11/04; F16L 21/06; F16L 31/00; F16L 23/06
USPC .................................. 285/260, 420; 138/119
See application file for complete search history.

(56) References Cited

U.S. PATENT DOCUMENTS

| | | | |
|---|---|---|---|
| 2,245,037 A | 6/1941 | Hersey, Jr. ................ 285/71 |
| 4,465,330 A | 8/1984 | DeCenzo .................. 339/14 |
| 5,366,263 A | 11/1994 | Hendrickson ............. 285/364 |
| 5,380,052 A | 1/1995 | Hendrickson ............. 285/364 |
| 5,540,465 A | 7/1996 | Sisk ........................ 285/365 |
| 5,607,107 A * | 3/1997 | Grieve ................. F16L 11/12 138/119 X |
| 5,620,210 A | 4/1997 | Eyster et al. ............. 285/81 |
| 5,722,666 A | 3/1998 | Sisk ........................ 277/101 |
| 6,425,608 B1 | 7/2002 | Nordstrom ............... 285/374 |
| 8,720,955 B2 | 5/2014 | Untch .................... 285/365 |
| 2003/0197381 A1 | 10/2003 | Lehnhardt ............... 285/364 |
| 2005/0023824 A1 | 2/2005 | Breay et al. .............. 285/1 |
| 2010/0117360 A1 | 5/2010 | Chan ...................... 285/373 |
| 2014/0224373 A1* | 8/2014 | Brown ................. F16L 11/12 138/119 |
| 2015/0285419 A1 | 10/2015 | Hinkle | |

* cited by examiner

*Primary Examiner* — Zachary T Dragicevich
(74) *Attorney, Agent, or Firm* — Keisling & Pieper PLC; David B. Pieper (57) ABSTRACT

A tubing clamp and method using an inner ring providing shape support to a layflat tubing to provide a compression surface against which an outer split ring with segmented pressure fingers can be compressed using an overcenter clamp to secure a back folded first end of a piece of tubing to a second overlaid tubing end.

6 Claims, 9 Drawing Sheets

*FIG. 21*

OVERCENTER PIPE CLAMP AND METHOD FOR LAY FLAT TUBING

CROSS-REFERENCE TO RELATED APPLICATIONS

This application claims priority to of U.S. application Ser. No. 14/246,840 filed by Hinkle on Apr. 7, 2014 entitled Overcenter Pipe Clamp and Method for Lay Flat Tubing now abandoned which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in a pipe clamp for a flexible lay flat tubing such as that used in row crop irrigation systems. More particularly, the invention relates to improvements particularly suited for applying appropriate pressure to the clamping area and frictionally engaging a sufficient amount of tubing without tearing or otherwise damaging the tubing.

2. Description of the Known Art

As will be appreciated by those skilled in the art, pipe clamps are known in various forms to apply high amounts of pressure to pipe joints. However, it is not know how to quickly attach low pressure irrigation tubing without tearing or damaging the tubing.

Poly lay flat flexible irrigation tubing 10 is a polyethylene tubing used with irrigating row crops in level grade farming sold under trade names like POLYPIPE or DURAPIPE. Poly-Pipe lay-flat flexible tubing is a long, generally one thousand foot or more, seamless tube packaged flattened in convenient rolls which can be unwound from the back of a vehicle or manually. Poly-Pipe lay-flat flexible tubing is not designed to transfer water over hills or up grades. This is an extremely low cost temporary irrigation system for use in irrigating fields. Typically provided in diameters of 7, 9, 10, 12, 15, or 18 inches and a thickness of 7 or 10 mil. It is designed for high volume low pressure flows and is not designed for use in moving water uphill or over berms. Thus, unlike flexible pipes used on fire trucks, poly pipe is not designed for high pressure and is not provided with couplings or connectors because it has to be cut to length in the field. In typical applications, miles of pipe are laid in the spring and taken up and recycled each fall. Because the pipe is provided in short sections, hundreds, if not thousands of connections may have to be done each spring and then removed each fall.

Patents disclosing information relevant to pipe clamps include: U.S. Pat. No. 5,722,666, issued to Sisk on Mar. 3, 1998, entitled Pipe coupler gasket with triangular sealing ridges; U.S. Pat. No. 5,540,465, issued to Sisk on Jul. 30, 1996 entitled Pipe, valve and/or tee coupler; U.S. Pat. No. 5,380,052, issued to Hendrickson on Jan. 10, 1995 entitled Releasable handle-type fastener for pipe couplings; and U.S. Pat. No. 5,366,263, issued to Hendrickson on Nov. 22, 1994 entitled Releasable fastener for pipe couplings. Each of these patents is hereby expressly incorporated by reference in their entirety. From these prior references it may be seen that these prior art patents are very limited in their teaching and utilization, and an improved over center pipe clamp is needed to overcome these limitations.

SUMMARY OF THE INVENTION

The present invention is directed to an improved over center pipe clamp using an inner ring, outer ring with extending arms and compression fingers, and an over center clamp. In accordance with one exemplary embodiment of the present invention, an over center pipe clamp is provided using a clamping segments and spacing segments to provide high gripping force sufficient for use with thin wall tubing while providing a low pressure sealing force in a quick installation and quick removal pipe clamp. A method for installing the splice is taught so that the interior of the pipe flow is not impeded with flapping or exposed end sections. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in FIGS. 1 through 7 of the drawings, one exemplary embodiment of the present invention is generally shown as a lay flat pipe quick clamp 100 for poly lay flat flexible irrigation tubing 10. FIGS. 1, 4, 5, 6, and 7 show the poly lay flat flexible irrigation tubing 10 with a pipe inner surface 12, non-structural collapsing pipe wall 14 with a cracking or minimum bend 15, and a pipe outer surface 16. The minimum bend 15 is the sharpest radius that may be used without cutting or tearing the tubing 10. A first tubing end 20 and second tubing end 30 are shown for clamping.

As shown in FIGS. 1 through 7 of the drawings the lay flat pipe quick clamp 100 is constructed from an inner shape ring 200, an outer split ring 300, and an overcenter clamp 400.

The inner shape ring 200 includes an inner flow surface 202 between a left folding edge 204 and a right folding edge 206 so that either direction of flow may be utilized in the tubing 10. Each folding edge 204, 206 has a minimum folding radius 208 greater than the minimum bend 15 of the tubing. The inner shape ring 200 also includes an outside clamping surface 210 that is used to contact the tubing 10 and compressably secure it in position. The outside clamping surface 210 defines width for the ring clamping surface 201. In this embodiment, the ring clamping surface 201 extends from the left folding edge 204 to the right folding edge 206.

The outer split ring 300 includes an inside clamping surface 302 that works with the outside clamping surface 210 of the inner ring 200 to compressably, sealably, and frictionally hold the tubing 10 in position. The outer split ring 300 includes a left capturing edge 304 and right capturing edge 306. Each capturing edge 304, 306 is shown with multiple capturing segments 308 alternating with multiple spacing segments 318 around the outer ring 300. Each capturing segment 308 includes an extending arm 310 reaching out an extending distance 311 to support a catch finger 312. Each catch finger is made with a finger depth 314 terminating at a finger tip 315 with a tip radius 316 greater than the minimum bend 15 of the tubing 10. If the left edge is provided with a capturing segment 308 then the preferred embodiment uses a spacing segment 318 on the right edge. These alternating sections and opposite alternating sides provide gripping while flexing alternating sides of the outer ring 300 to prove the downward force without harming the thin wall of the tubing 10. In this manner, only one half of the gripping force is applied on one side of the outer ring 300 such that the tubing is not exposed to a continuous or circular point load to stress the rubbing 10.

The outer ring 300 is split at an adjustable joint 320. The adjustable joint 320 includes a left ring end 322 with a left clamping surface 324 and a left sliding overlap finger 326 separated by a ring gap 327 to a right ring end 328 with a right clamping surface 330 and a right sliding overlap finger 332.

The adjustable joint is opened, closed, and secured by an overcenter clamp 400. The overcenter clamp is built off of a base handle riser 402 connected to the right ring end 328 by rivets, glue or the other securing method. The base handle riser 402 includes a handle pivot 404 that pivotally supports a layflat pipe clamp handle 406 the is positioned to be able to provide an over center clamping force to lock the handle in position. The handle 406 includes an arm pivot 408 connecting an extending catch arm 410 with a length adjuster 412 for engaging a catch slot 416 in a catch riser 414 secured to the left ring end 322.

Figure 1:
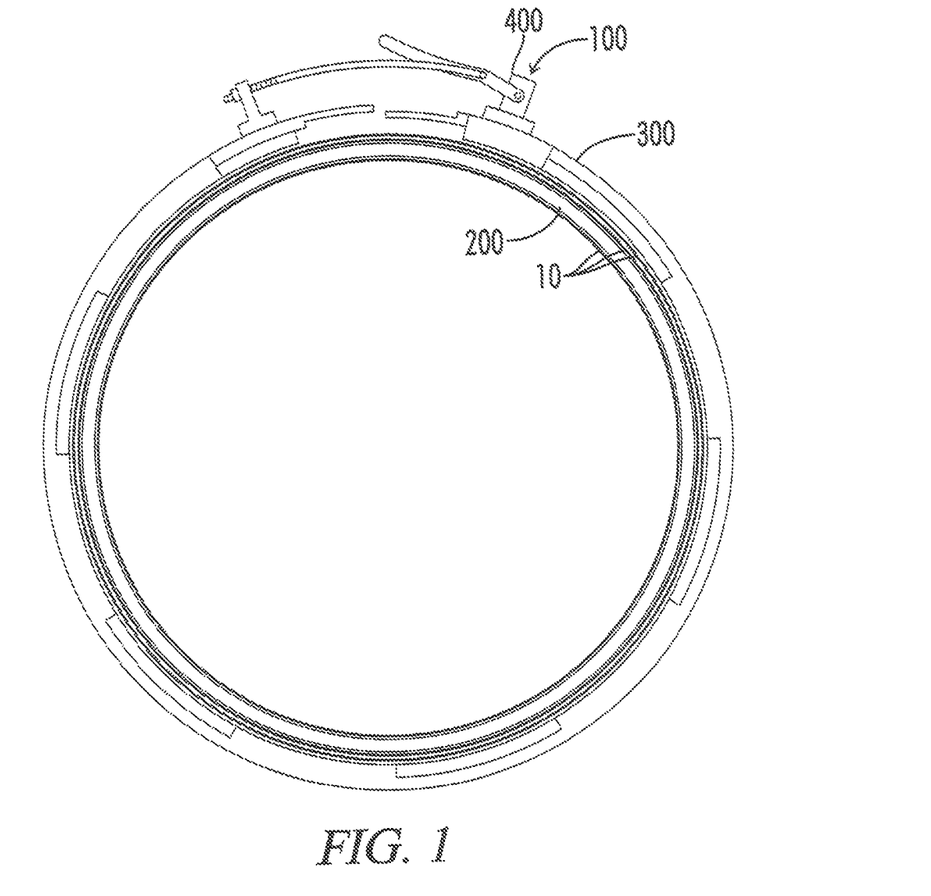
FIG. 1 is a schematic front view of the overcenter pipe clamp with extending compression fingers of the present invention.
Figure 2:
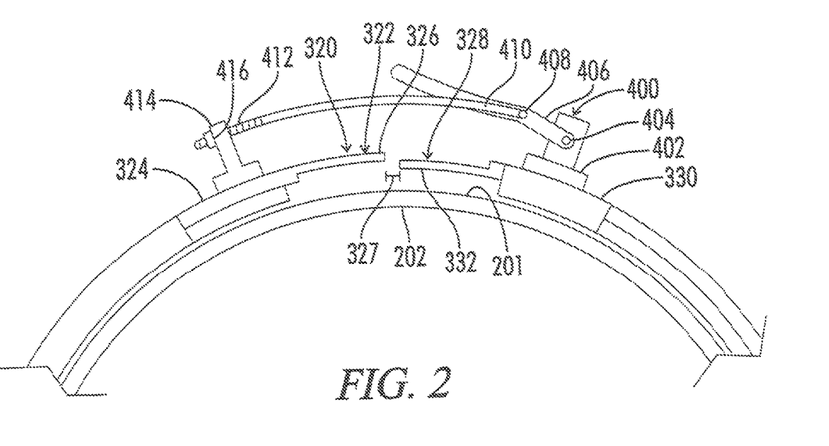
FIG. 2 is a larger view of the overcenter pipe clamp of FIG. 1 showing an open position.
Figure 3:
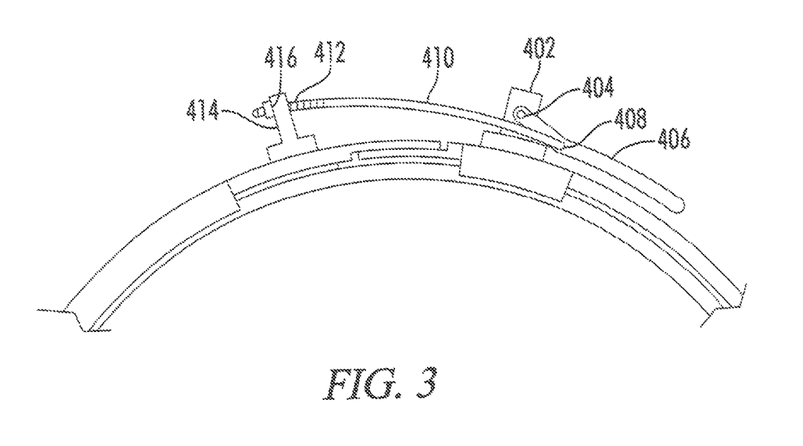
FIG. 3 is a larger view of the overcenter pipe clamp of FIG. 1 showing a closed position.
Figure 4:
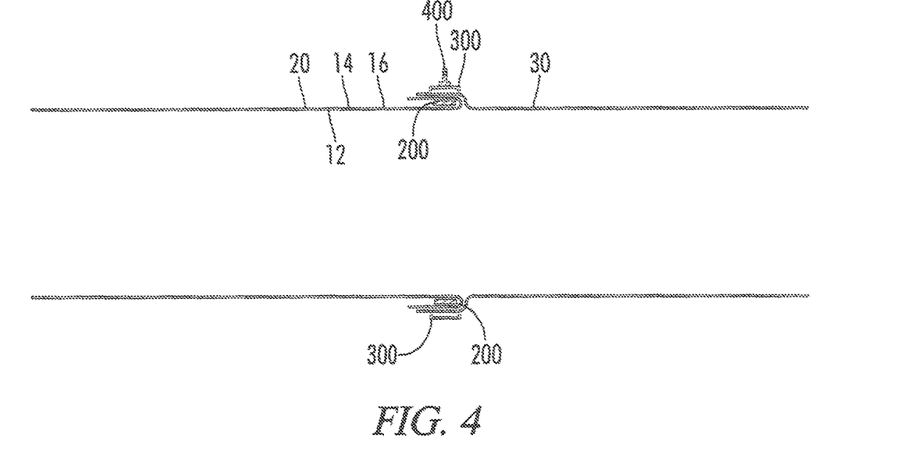
FIG. 4 is a cutaway view of the overcenter pipe clamp of FIG. 1 showing the first and second pipe ends with the clamp in an open position.
Figure 5:
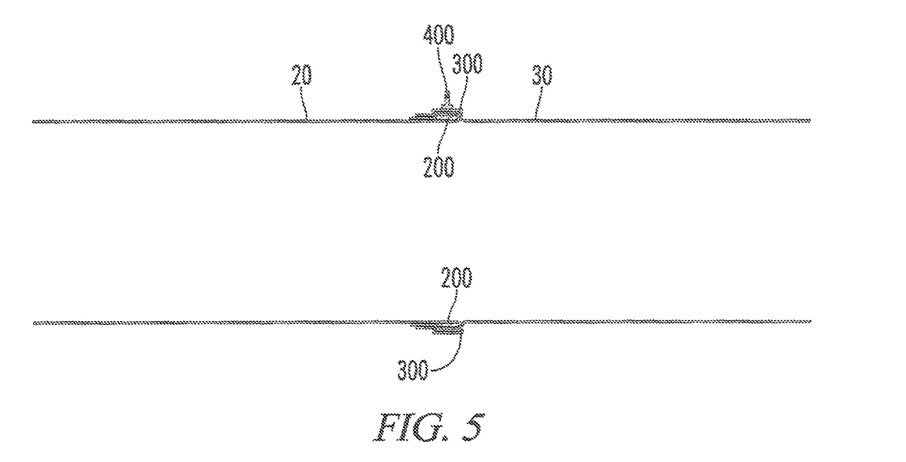
FIG. 5 is a side cutaway view of the overcenter pipe clamp of FIG. 1 showing the first and second pipe ends with the clamp in a closed position.
Figure 6:
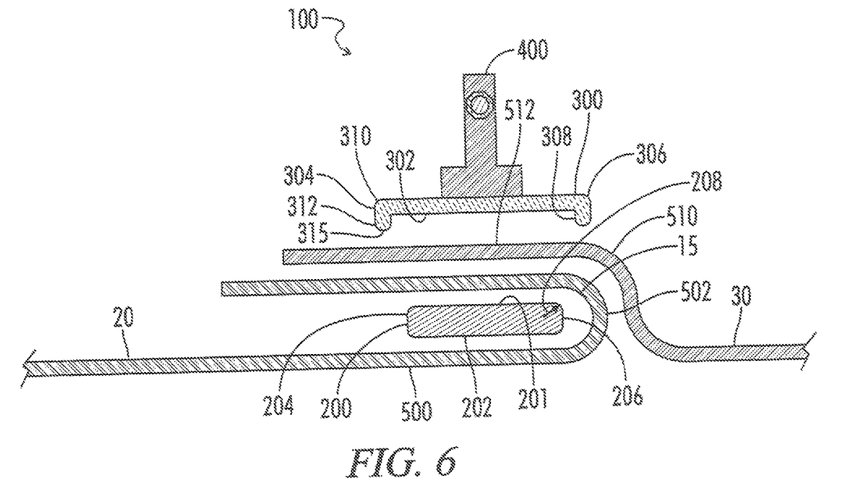
FIG. 6 is a larger side cutaway view of the first and second pipe ends with the clamp in an open position.
Figure 7:
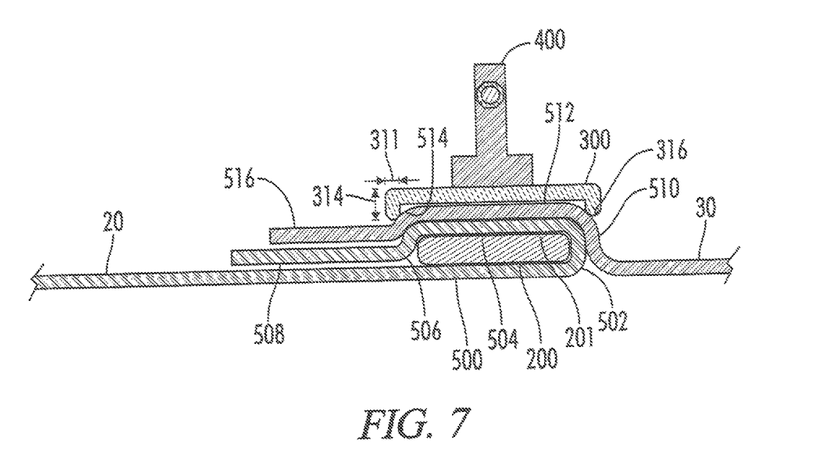
FIG. 7 is a larger side cutaway view of the first and second pipe ends with the clamp in a closed position.
Figure 8:
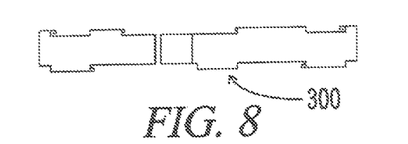
FIG. 8 is a top view of the outer ring.
Figure 9:
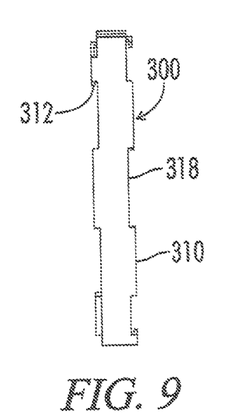
FIG. 9 is a left side view of the outer ring.
Figure 10:
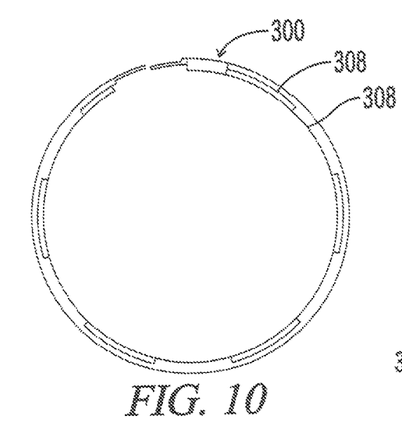
FIG. 10 is a front view of the outer ring.
Figure 11:
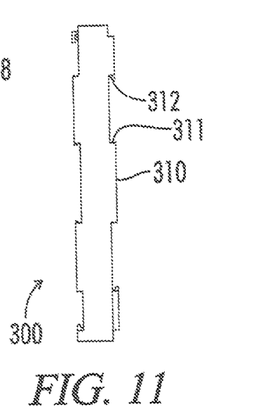
FIG. 11 is a right side view of the outer ring.
Figure 12:
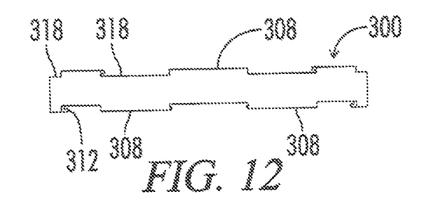
FIG. 12 is a bottom view of the outer ring.
Figure 13:
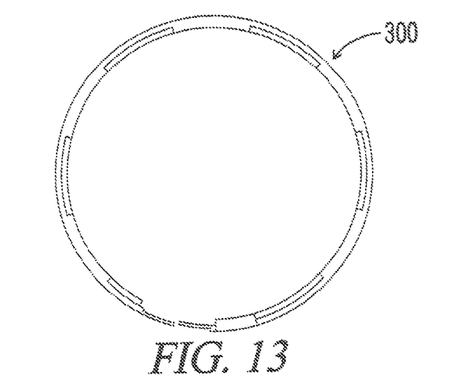
FIG. 13 is a back view of the outer ring.
Figure 14:
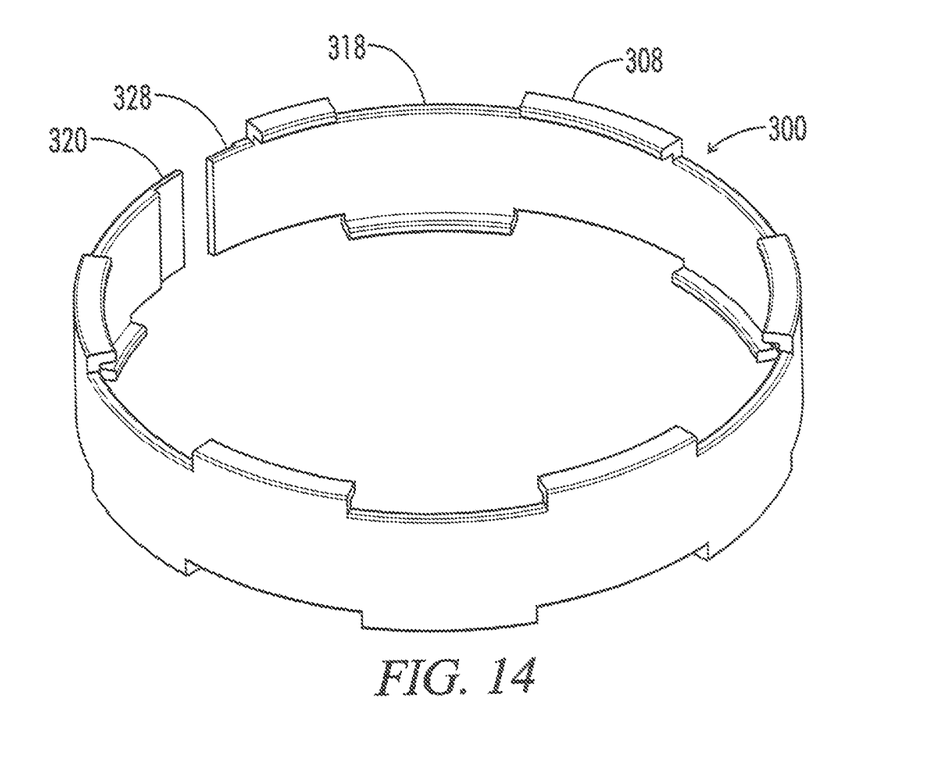
FIG. 14 is an isometric view of the outer ring.
Figure 15:
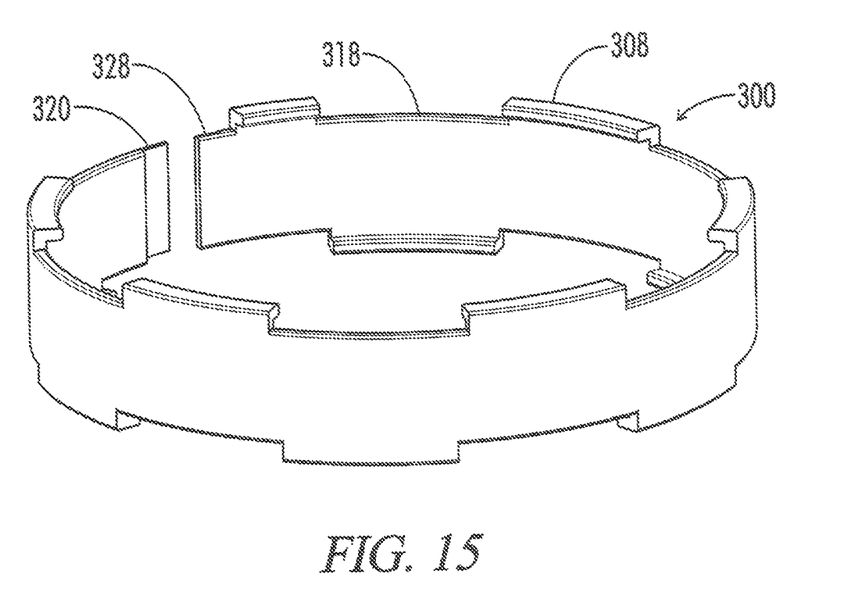
FIG. 15 is another angle of an isometric view of the outer ring.
Figure 16:
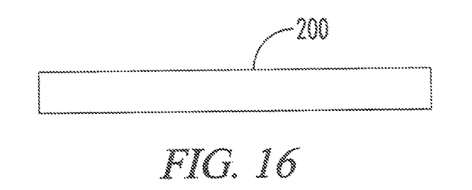
FIG. 16 is a top view of the inner ring.
Figure 17:
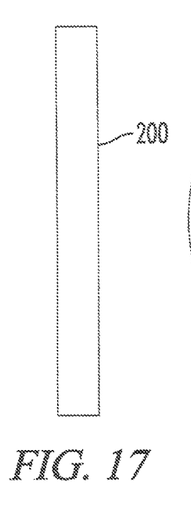
FIG. 17 is a left side view of the inner ring.
Figure 18:
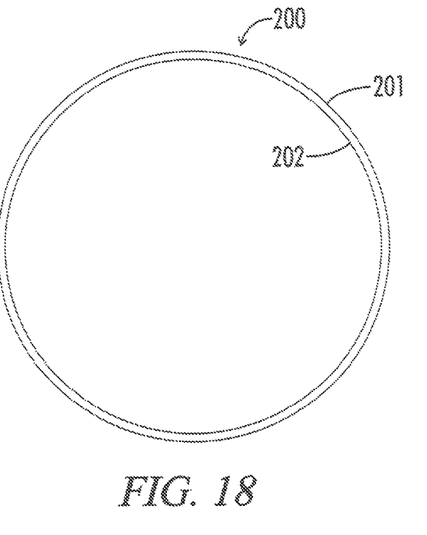
FIG. 18 is a front view of the inner ring, the back view being the same.
Figure 19:
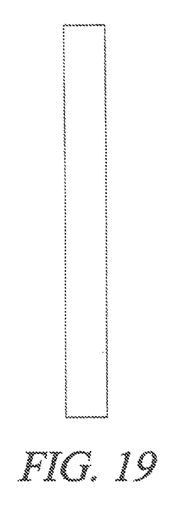
FIG. 19 is a right side view of the inner ring.
Figure 20:
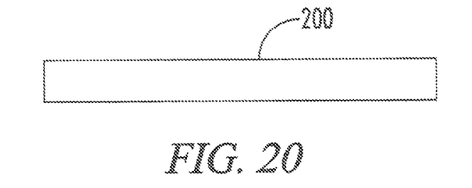
FIG. 20 is a bottom view of the inner ring.
Figure 21:
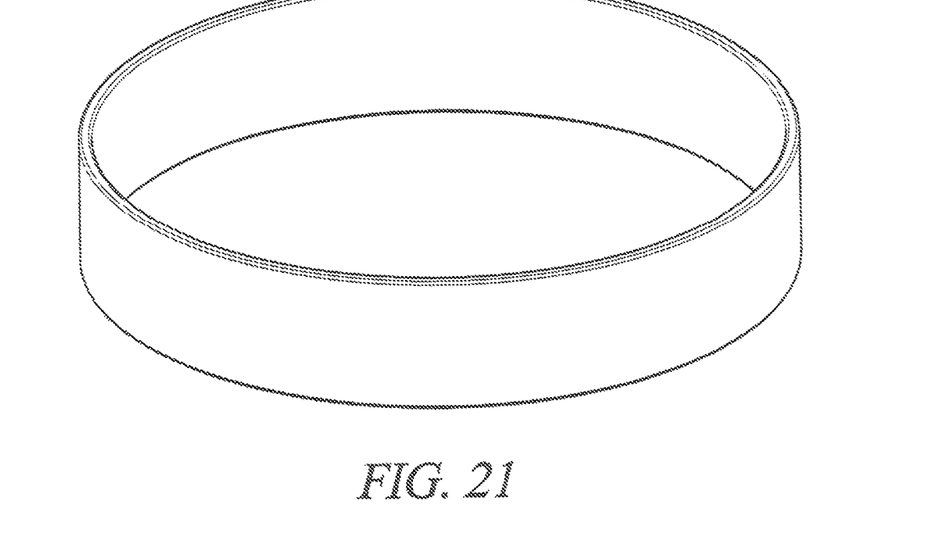
FIG. 21 is an isometric view of the inner ring.

As best seen in FIGS. 6 and 7, the first tubing end 20 is passed through the inner flow surface 202 of the inner ring 200 to form a first pipe through section 500. The first tubing 20 is then folded back upon itself to form a first pipe rise deflection section 502 and then passes back over the ring clamping surface 201 to form a first pipe center span section 504, first pipe drop deflection section 506, and first pipe overage section 508. The second tubing end 30 is positioned over the installed first tubing end 20 to form a right pipe rise deflection section 510, a right pipe center span section 512, a right pipe drop deflection section 514, and a right pipe overage section 516. As can be noted by FIGS. 6 and 7, the inner ring and outer ring provide a wide clamping surface to seal and frictionally engage the tubing 10 and hold it in position with additional force provided by the capturing segments 308. The extending arm 310 allows for an flexing pressure to be absorbed and applied to the catch finger 312. The ring material for the outer ring 300 should be selected to allow for this flexible pressure to be applied to the catch finger 312 and the finger depth 314 should be selected to provide the requisite force based on the thickness of the tubing 10 to secure the tubing 10 in place without tearing the tubing 10.

Reference numerals used throughout the detailed description and the drawings correspond to the following elements:

Poly lay flat flexible irrigation tubing 10
Pipe inner surface 12
Non-structural collapsing pipe wall 14
Pipe outer surface 16
First tubing end 20
Second tubing end 30
Lay flat pipe quick clamp 100
Inner shape ring 200
Inner flow surface 202
Ring clamping surface 201
Left Folding edge 204
Right folding edge 206
Folding radius 208
Outside clamping surface 210
Outer split ring 300
Inside clamping surface 302
Left Capturing edge 304
Right capturing edge 306
Capturing segment 308
Extending arm 310
Extending distance 311
Catch finger 312
Finger depth 314
Finger tip 315
Tip radius 316
Spacing segment 318
Adjustable joint 320
First ring end 322

First clamping surface 324
First sliding overlap finger 326
Ring gap 327
Right ring end 328
Right clamping surface 330
Right sliding overlap finger 332
Overcenter clamp 400
Handle riser 402
Handle pivot 404
Layflat pipe clamp handle 406
Arm pivot 408
Extending catch arm 410
Length adjuster 412
Catch riser 414
Catch slot 416
First pipe through section 500
First pipe rise deflection section 502
First pipe center span section 504
First pipe drop deflection section 506
First pipe overage section 508
Second pipe rise deflection section 510
Second pipe center span section 512
Second pipe drop deflection section 514
Second pipe overage section 516

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A lay flat pipe quick clamp apparatus comprising:
a first lay flat flexible irrigation tubing having, a first inner surface, a first collapsing pipe wall, and a first outer surface;
a second lay flat flexible irrigation tubing having, a second inner surface, a second collapsing pipe wall, and a second outer surface;
the lay flat pipe quick clamp including
an inner shape ring including an inner flow surface, at least one folding edge, and an outer clamping surface,
an outer split ring including a first ring end and a second ring end defining a ring gap, an inside clamping surface, and at least one capturing edge, the capturing edge including a catch finger, the first and second collapsing pipe wall positioned between the outer clamping surface of the inner shape ring and the inside clamping surface of the outer split ring, the first lay flat flexible irrigation tubing continuously extending through and past the outer split ring to form an overage section, and
an overcenter clamp connected to the first ring end and the second ring end across the ring gap.

2. The apparatus of claim 1, the inner ring further comprising:
the at least one folding edge including a second folding edge opposite a first folding edge.

3. The apparatus of claim 1, further comprising:
the first lay flat flexible irrigation tubing having a cracking radius;
the inner ring having a folding radius greater than the cracking radius of the first lay flat flexible irrigation tubing.

4. The apparatus of claim 1, the outer split ring further comprising:
the at least one folding edge including a second capturing edge opposite a first capturing edge.

5. The apparatus of claim 1, the at least one capturing edge comprising both a capturing segment and a spacing segment.

6. The apparatus of claim 1, further comprising:
the first lay flat flexible irrigation tubing having a cracking radius;
the at least one capturing edge having a tip radius greater than the cracking radius of the first lay flat flexible irrigation tubing.

* * * * *